(12) United States Patent
Ma

(10) Patent No.: US 10,753,110 B2
(45) Date of Patent: Aug. 25, 2020

(54) RACK STRUCTURE FOR AN IN-FIELD 3D CONSTRUCTION PRINTER

(71) Applicant: Yingchuang Building Technique (Shanghai) Co., Ltd, Shanghai (CN)

(72) Inventor: Yihe Ma, Shanghai (CN)

(73) Assignee: Yingchuang Building Technique (Shanghai) Co., Ltd, Shanghai (CN)

(*) Notice: Subject to any disclaimer, the term of this patent is extended or adjusted under 35 U.S.C. 154(b) by 443 days.

(21) Appl. No.: 15/839,398

(22) Filed: Dec. 12, 2017

(65) Prior Publication Data

US 2018/0230703 A1  Aug. 16, 2018

(30) Foreign Application Priority Data

Feb. 10, 2017 (CN) .......................... 2017 1 0072546

(51) Int. Cl.
| | |
|---|---|
| *E04G 21/04* | (2006.01) |
| *B28B 1/00* | (2006.01) |
| *E04B 1/35* | (2006.01) |
| *E04B 1/16* | (2006.01) |
| *B33Y 40/00* | (2020.01) |
| *B33Y 30/00* | (2015.01) |

(52) U.S. Cl.
CPC .............. *E04G 21/04* (2013.01); *B28B 1/001* (2013.01); *E04B 1/35* (2013.01); *E04G 21/0427* (2013.01); *E04G 21/0463* (2013.01); *B33Y 30/00* (2014.12); *B33Y 40/00* (2014.12); *E04B 1/16* (2013.01)

(58) Field of Classification Search
CPC . E04G 21/04; E04G 21/0463; E04G 21/0427; E04G 21/00; E04B 1/35; E04B 1/16; B33Y 40/00; B33Y 30/00; B29C 64/245
See application file for complete search history.

(56) References Cited

U.S. PATENT DOCUMENTS

| | | | |
|---|---|---|---|
| 2010/0119336 A1* | 5/2010 | Echauri Senosiain | ...................... E04G 21/16 414/10 |
| 2010/0207288 A1* | 8/2010 | Dini | ........................ B28B 7/465 264/33 |

FOREIGN PATENT DOCUMENTS

CN            205134949 U    *  4/2016

\* cited by examiner

*Primary Examiner* — Joseph S Del Sole
*Assistant Examiner* — Mohamed K Ahmed Ali
(74) *Attorney, Agent, or Firm* — Treasure IP Group, LLC

(57) ABSTRACT

This invention discloses a rack structure for an in-field 3D construction printer, which comprises the vertical supporting posts consisting of connected standard vertical supporting post segments in two rows with symmetrical arrangement, a printing platform, a power and material storage platform, and lifting mechanism; said two rows of the vertical supporting posts are symmetrically arranged and fixed on the ground; the printing platform, and the power supply and material storage platform are fixed on the vertical supporting post through their respective cavities, and then the printing platform and the power and material storage platform are bolted on the vertical supporting post; the steel wire rope runs through a lifting drum, to a pulley block on the side of the power supply and material storage platform, and then from the intermediate pulley block to the pulley block on the side of the printing platform.

2 Claims, 2 Drawing Sheets

RACK STRUCTURE FOR AN IN-FIELD 3D CONSTRUCTION PRINTER

CROSS REFERENCE TO RELATED APPLICATION

This application claims priority to a Chinese Application No. 2017100725461, filed on Feb. 10, 2017. The Chinese Application is incorporated herein by reference in its entirety.

TECHNICAL FIELD

This invention involves a building construction machinery, specifically the rack structure for an in-field 3D construction printer.

BACKGROUND TECHNOLOGY

In the existing technology, the construction of an exterior wall, insulation and exterior wall decoration for most buildings is basically implemented in steps. During exterior wall construction, the interior/exterior molds are required. For insulation and exterior wall decoration, it is necessary to is provided with up a scaffold, however bring such scaffold structure can complicate a construction procedure, cause long construction time and create heavy material wasting. In recent years, with the progress of digital technology, some building members can be implemented with a 3D printing technology in a plant building, and the building members from the digital print can be sent to the field for installation. But this is not a field print, and it is still a distance away from a truly 3D printed building. Field print means printing on the spot, in the field. Even for the buildings printed on the spot in the field, following problems occurs. For example, 3D printing head has to rise as the height of the building increases, so far there is not a good method to achieve the height management, therefore the current 3D printed building is only limited to one or two floors in height. Another prominent issue is that the cement concrete mortar required by the 3D printing has even poorer ability to flow and is more difficult to transport, compared with cement concrete mortar used in the traditional process. In addition, simultaneous construction of water and electricity equipment and a series of other issues have yet to be resolved. The technology of printing buildings needs to be further improved.

SUMMARY OF THE INVENTION

The objective of this invention is to provide a rack structure for an in-field 3D construction printer capable of elevating 3D print head as the height of the building increases, and reducing the cement mortar transport distance. The present invention overcomes the existing technical shortcomings.

This invention is accomplished by the following technical solutions. The rack structure for one in-field 3D construction printer includes the vertical supporting posts consisting of connected standard vertical supporting post segments in two rows with symmetrical arrangement, characterized by the printing platform, power and material storage platform, lifting mechanism.

In accordance with the aspects of the present invention, said printing platform is a circular frame formed by horizontal and longitudinal beams, and two horizontal beams, each has a cavity which can pair with the corresponding vertical supporting posts to form a slide pair. On the longitudinal sides of the cavity of the two horizontal beams, the seating holes are provided in order to anchor the horizontal beams onto the vertical supporting post. The right side of the cavity along the horizontal direction, is provided with a base for the installation of the side pulley block for the lifting mechanism and the printing platform. The upper surface of the horizontal beam is provided with a guide rail for the slide of the cart of 3D print head, and longitudinal beam is fixed on two ends of the horizontal beam.

The said power and material storage platform is the outer circular frame formed by the horizontal and longitudinal beams and the I-shaped inner frame formed by the horizontal and longitudinal beams. The said two horizontal beams for the outer circular frame have cavities that can form slide pairs with the corresponding vertical supporting posts. The two sides of the cavity along the longitudinal direction are provided with sitting hole for anchoring the horizontal beam onto the vertical supporting posts; The horizontal left side of the cavity is provided the bases respectively for the installation of the side pulley block for of the lifting mechanism to lift the power and material storage platform and for fixing a power unit of the lifter. The horizontal beam of said I-shaped inner frame is fixed on the two longitudinal beams, both ends of which are fixed on the horizontal beams of the outer circular frame. The longitudinal beam of the said outer circular frame is provided with a base for the installation of the crane, and the horizontal beam of the said I-shaped inner frame is provided with a guide rail for the horizontal movement of the supply and storage hopper.

Said vertical supporting post is provided with the anchor holes on both longitudinal walls corresponding to the printing platform and the power and material storage platform, and the top of the vertical supporting post is provided with a fixing base for fixing an intermediate pulley block of the lifting mechanism.

Said lifting mechanism includes a power unit integrated with a machine base, motor, gearbox, brake and lifting drum, intermediate pulley block, the pulley block on the side of the printing platform, the pulley block on the side of the power and material storage platform, and steel wire ropes; said intermediate pulley block is fixed on the vertical supporting post, and one side of the intermediate pulley block corresponds to the pulley block on the side of the power and material storage platform, and the other side corresponds to the pulley block on the side of the printing platform, and the lifting drum of the power unit corresponds to the pulley block on the side of the power and material storage platform.

Said two rows of the vertical supporting posts are symmetrically arranged and fixed on the ground. The printing platform and the power and material storage platform are fixed on the vertical supporting post through their respective cavities, and then the printing platform and the power and material storage platform are bolted on the vertical supporting post. The steel wire rope runs through the lifting drum, to the pulley block on the side of the power and material storage platform, and then from the intermediate pulley block to the pulley block on the side of the printing platform.

Compared with the existing technology, the rack structure for one in-field 3D construction printer disclosed in this invention has the following advantages: in this invention, the printing platform and the power and material storage platform are placed on different floors, allowing the lifting of the printing platform or the lifting of the power and material storage platform to be carried out according to the actual need by operation of the lifting mechanism, which not only accomplishes continuous printing of 3D print head, but also provides material supply continuously and make a substantial progress in the industry.

DESCRIPTION OF THE EMBODIMENTS

This invention will be further described in combination with the embodiments below.

Figure 1:
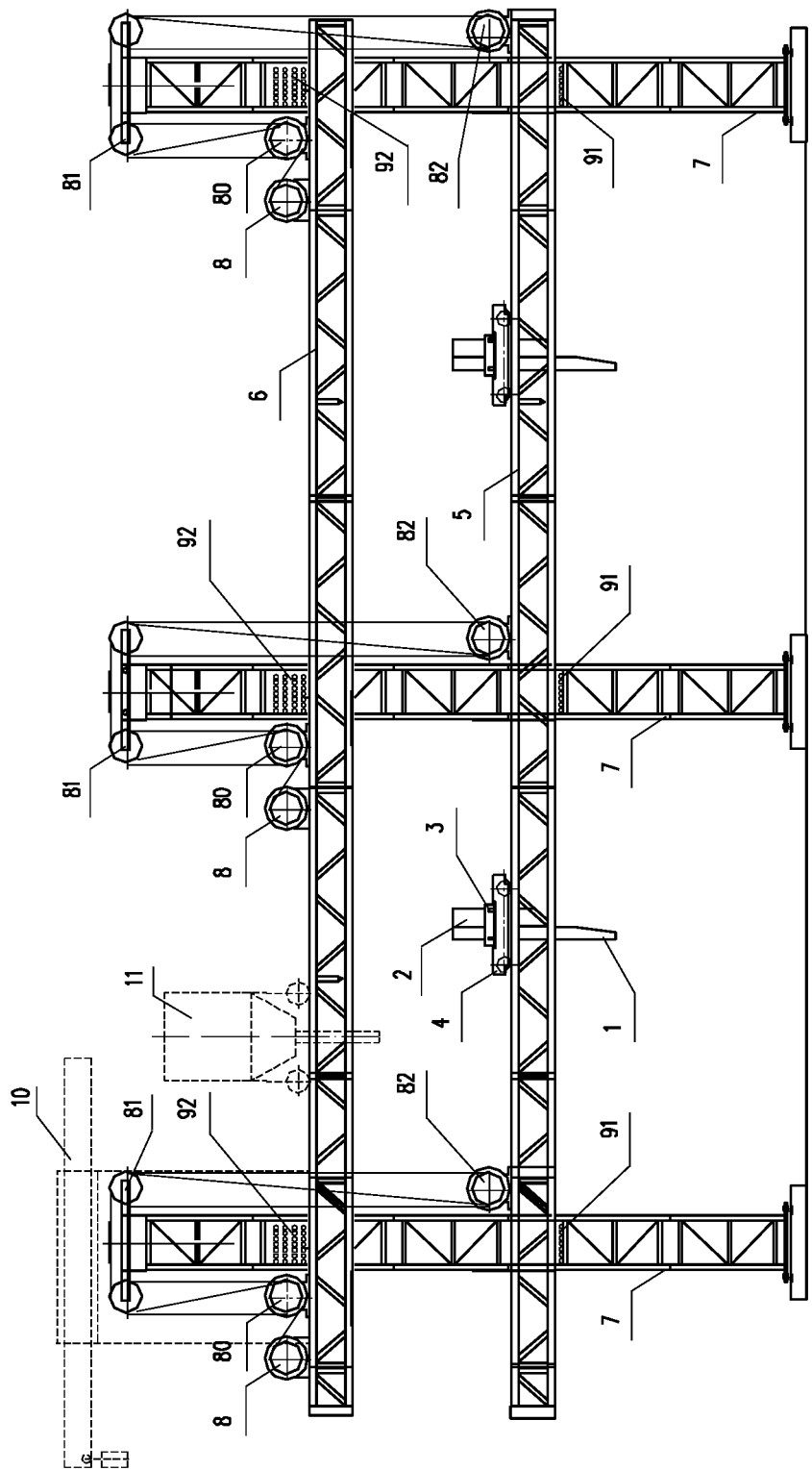
FIG. 1 is a schematic diagram for the structure according to one embodiment of this invention.
Figure 2:
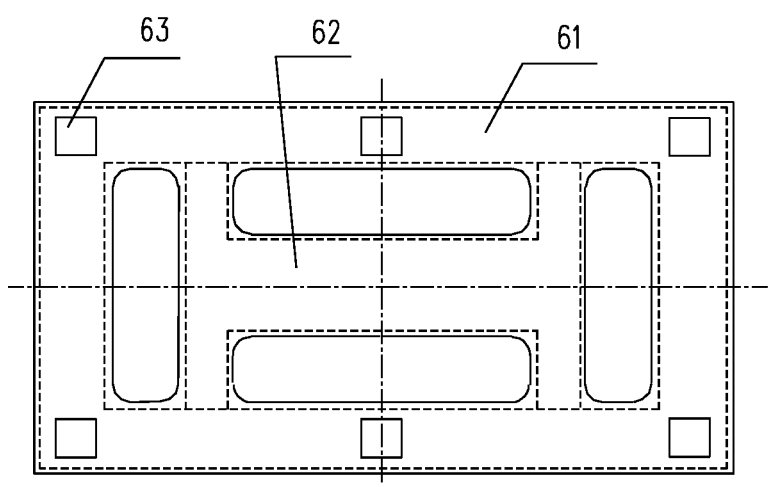
FIG. 2 is the schematic diagram for the outer and inner frames of the power and material storage platform in the embodiment of FIG. 1.

FIG. 1-2 are schematic diagrams illustrates one embodiment in this invention. In these figures, the rack structure for one in-field 3D construction printer includes vertical supporting post 7 consisting of standard vertical supporting post segments, connected to each other, in two rows with symmetrical arrangement, a horizontal slide pair 4 of the print head 1, a longitudinal slide pair 3 of the print head 1, a vertical slide pair of the print head 1, the printing platform 5, power and material storage platform 6, and the lifting mechanism.

Said printing platform 5 is a circular frame formed by the horizontal and longitudinal beams, and the two horizontal beams are provided with cavies configured to from slide pairs with the corresponding vertical supporting posts 7. The longitudinal two sides of each cavity are provided with the seating holes 91 for anchoring the horizontal beams on the vertical supporting posts, and the horizontal right side of the cavity is provided with base 82 in order to install of a side pulley block for the lifting mechanism and the printing platform. The upper surface of the horizontal beam is provided with a guide rail for the slide of the slide pair 4 of 3D print head, and each longitudinal beam is fixed on two ends of the horizontal beam;

The said power and material storage platform 6 is the outer circular frame 61 formed by the horizontal and longitudinal beams and the I-shaped inner frame 62 formed by the horizontal and longitudinal beams. The two horizontal beams for the outer circular frame are is provided with cavity 63 configured to form slide pair with the corresponding vertical supporting posts. The longitudinal two sides of each cavity are provided with seating hole 92 for anchoring the horizontal beam onto the vertical supporting post. The horizontal left side of the cavity is provided with the bases 80 respectively for the installation of the side pulley block for the power and material storage platform of the lifting mechanism and the base 8 for fixing the power unit of the lifter. The horizontal beam of the said I-shaped inner frame is fixed on two longitudinal beams, both ends of which are fixed on the horizontal beams of outer circular frame. The longitudinal beam of the said outer circular frame is provided with the base for the installation of the crane 10, and the horizontal beam of the said I-shaped inner frame provided with the guide rail for the horizontal movement of the supply and storage hopper 11.

The said vertical supporting post 7 is provided with the anchor holes on both longitudinal walls corresponding to the printing platform and the power and material storage platform, and the top of the vertical supporting post 7 is provided with the fixing base for fixing the intermediate pulley block 81 of the lifting mechanism.

Said lifting mechanism includes power unit 8 integrated with a machine base, motor, gearbox, brake and lifting drum, intermediate pulley block 81, the pulley block 82 on the side of the printing platform, the pulley block 80 on the side of the power and material storage platform, and steel wire ropes; said intermediate pulley block 81 is fixed on the vertical supporting post 7, and one side of the intermediate pulley block 81 corresponds to the pulley block 80 on the side of the power and material storage platform, and the other side corresponds to the pulley block 82 on the side of the printing platform, and the lifting drum of the power unit 8 corresponds to the pulley block 80 on the side of the power and material storage platform.

Said two rows of the vertical supporting posts 7 are symmetrically arranged and fixed on the ground. The printing platform 5 and the power and material storage platform 6 are fixed on the vertical supporting post 7 through their respective cavities, and then the printing platform 5 and the power and material storage platform 6 are bolted on the vertical supporting post 7. The steel wire rope runs through the lifting drum, to the pulley block 80 on the side of the power and material storage platform, and then from the intermediate pulley block 81 to the pulley block 82 on the side of the printing platform.

This invention works like according to the following principles. The power and material storage platform is installed above the printing platform, the crane lifts the concrete mortar into the storage hopper on the same floor, and the concrete mortar enters from the storage hopper into 3D print head, then the building is printed using 3D construction printer through the horizontal slide pair of the print head, longitudinal slide pair of the print head and vertical slide pair of the print head in a pre-determined sequence. When it is required to lift the printing platform, it is first to release the printing platform from the vertical supporting post, disengage the anchor bolt on the vertical supporting post, tighten the wire rope for the power unit of the lifting mechanism, lift it to the desired position, then fix the printing platform with the anchor bolt on the desired positon of the vertical supporting post; when it is required to lift the power and material storage platform, it is required to release the power and material storage platform from the vertical supporting post, disengage the anchor bolt on the vertical supporting post, tighten the wire rope for the power unit of the lifting mechanism, lift it to the specified position, then fix the power and material storage platform with the anchor bolt on the desired position on the vertical supporting post, for further printing.

The structure in this invention has been described in combination with the attached drawings and the embodiment, and it does not constitute the restriction to this invention. The skilled technical personnel in this field can make the adjustment according to the actual need, and the changes or modifications made within the scope of the claims shall be within the scope of protection.

The invention claimed is:

1. A rack structure for in-field 3D construction printer, comprising:
    two rows of vertical supporting posts, each consisting essentially of standard vertical supporting post segments, connected to each other;
    a printing platform,
    a power and storage platform, and a lifting mechanism, wherein said lifting mechanism comprises a power unit integrated with a machine base, motor, gearbox, brake, lifting drum, an intermediate pulley block, a pulley block on the side of the printing platform, a pulley block on the side of the power and storage platform, and steel wire ropes; said intermediate pulley block is fixed on the vertical supporting post, and one side of the intermediate pulley block corresponds to the pulley block on the side of the power and storage platform, and the other side corresponds to the pulley block on the side of the printing platform, and the lifting drum of the power unit corresponds to the pulley block on the side of the power and storage platform;

wherein said printing platform is a circular frame formed by horizontal and longitudinal beams, and the each horizontal beam is provided with a first slide pair with the corresponding vertical supporting post; longitudinal beams are provided with a first group of seating holes for anchoring the horizontal beams on the vertical supporting posts, and horizontal right side of the first group of seating holes is provided with a base for installation of a side pulley block for the lifting mechanism and the printing platform; an upper surface of the horizontal beam is provided with a guide rail for slide of a cart of a 3D print head, and each longitudinal beam is fixed on two ends of the horizontal beam;

said power and storage platform is an outer circular frame formed by horizontal and longitudinal beams and a I-shaped inner frame formed by the horizontal and longitudinal beams; two horizontal beams for the outer circular frame are each is provided with a second slide pair with the corresponding vertical supporting posts; two longitudinal beams are provided with a second group of seating holes for anchoring the horizontal beam on the vertical supporting post; the horizontal left side of the second group of seating holes is provided with the bases respectively for the installation of the side pulley block for the power and storage platform of the lifting mechanism and for fixing the power unit of the lifting mechanism; the horizontal beam of the said I-shaped inner frame is fixed on two longitudinal beams, both ends of which are fixed on the horizontal beams of outer circular frame; the longitudinal beam of the said outer circular frame is provided with a base for the installation of a crane, and the horizontal beam of the said I-shaped inner frame is provided with a guide rail for the horizontal movement of the supply and storage hopper; said vertical supporting post is provided with anchor holes on both longitudinal walls corresponding to the printing platform and the power and storage platform, and the top of the vertical supporting post is provided with a fixing base for fixing the intermediate pulley block of the lifting mechanism.

2. A method for assembling the rack of claim 1, the method comprising:

fixing and arranging said two rows of the vertical supporting posts symmetrically on the ground; fixing the printing platform and the power and storage platform on the vertical supporting post through their respective cavities; attaching the printing platform and the power and storage platform using bolted on the vertical supporting post; running the steel wire rope through the lifting drum, to the pulley block on the side of the power and storage platform, from the intermediate pulley block to the pulley block on the side of the printing platform.

* * * * *